United States Patent [19]

McAdams et al.

[11] Patent Number: 5,137,412

[45] Date of Patent: Aug. 11, 1992

[54] TRAILER FOR HAULING BALES OF HAY

[75] Inventors: James A. McAdams; David S. Carrabba, both of Bryan, Tex.

[73] Assignee: Gooseneck Trailer Mfg. Co., Inc., Bryan, Tex.

[21] Appl. No.: 660,287

[22] Filed: Feb. 22, 1991

[51] Int. Cl.⁵ .............................................. B60P 1/24
[52] U.S. Cl. .................................... 414/470; 298/8 R; 298/17.6; 298/18; 414/24.5
[58] Field of Search ................. 298/8 R, 18, 17.6; 414/24.5, 470; 280/404; 296/6

[56] References Cited

U.S. PATENT DOCUMENTS

| | | | |
|---|---|---|---|
| 4,079,996 | 3/1978 | Vansickle | 298/8 R |
| 4,138,159 | 2/1979 | Hall | 298/18 |
| 4,242,031 | 12/1980 | McMullen | 414/470 |
| 4,411,572 | 10/1983 | Hostetler | 298/18 X |
| 4,470,747 | 9/1984 | Tichenor | 298/8 R X |
| 4,494,798 | 1/1985 | Bailey | 298/17.6 |

Primary Examiner—Robert J. Spar
Assistant Examiner—Janice Krizek
Attorney, Agent, or Firm—Kirk & Lindsay

[57] ABSTRACT

The present invention relates to a new and improved trailer for unloading large cylindrical bales of hay. The trailer has a simple rectangular frame that holds hay bale carriers in place by a dual latch/keeper assembly mechanism. The dual latch/keeper assembly allows the cradle to tilt in either lateral direction to dump the hay bales on either side of the trailer. As a safety factor for the operator, the release for the latch/keeper assembly is on the opposite side from the side upon which the carrier dumps. The present invention may include a pedestal which holds a hay bale cradle over the wheels. The pedestal is removably mounted so that both the pedestal and the pedestal cradle can be removed thereby allowing the trailer to carry goods other than hay, such as irrigation pipe. The raised pedestal also allows for fenders over the wheels of the trailer. Fenders and lights are provided to ensure that the trailer is street worthy.

13 Claims, 3 Drawing Sheets

TRAILER FOR HAULING BALES OF HAY

FIELD OF THE INVENTION

The present invention relates to a street worthy trailer for hauling large circular bales of hay that unloads from either side of the trailer without hydraulic or winch power and is adaptable to haul goods other than hay.

DESCRIPTION OF PRIOR ART

Trailers have been designed for many different uses. Some trailers are designed to dump a load without additional man power or machinery. Such trailers are more cost efficient. It is also beneficial to design trailers for use on public streets as well as for hauling a variety of goods.

In the prior art there are many trailers designed for carrying hay yet none have the ability to unload from both sides by a dual latch/keeper assembly system.

U.S. Pat. No. 4,079,996 discloses a hay bale carrier that only tips in one direction to dump its hay load. Single-direction dumping is accomplished through a rocking support frame that can be locked in a horizontal position when the bale is loaded. When it is desired to unload the hay bale, the latch can be opened and the support frame tilted in one direction to permit the unloading. The frame is constructed with sloping transverse members. Release of the latch causes the cradle to rotate in a sloping direction along the slope of the transverse member.

The disadvantages of the hay bale carrier described in U.S. Pat. No. 4,079,996 are that it can only rotate along the direction of the slope and this trailer is not adapted for use on public streets. Although this patent states that two frames could be placed side by side on a truck or trailer to load and unload from either side, no disclosure is made of a single frame concept designed for one cradle to dump in two directions.

SUMMARY OF THE INVENTION

The present invention relates to a new and improved trailer for unloading bales of hay. One advantage of this invention is the dual latch/keeper assembly which overcomes the limitations of the prior art by allowing the trailer to dump from either side rather than just one side. A second advantage of this invention is the pedestal which is removably mounted. The removably mounted pedestal overcomes the limitation of prior art by allowing the trailer to be both street worthy and usable for carrying elongated goods such as pipe.

This invention has a longitudinal rectangular frame with a plurality of transverse support members. A plurality of wheels and at least one axle are arranged along the frame for support. The rear of the frame has an upright arc shape tubing arrangement for the purpose of retaining the bales of hay. A means for coupling the trailer to a truck is positioned at the front of the frame.

A plurality of cylindrical hay bale cradles are pivotally secured to the frame so that the cradle axially rotates and can tip in either lateral direction. The dual latch/keeper assemblies allow the option of tilting each cradle in either lateral direction to dump the hay bales on either side of the trailer. As a safety factor for the operator, the release for the latch/keeper assembly is on the opposite side of the side upon which the cradle dumps. Pulling on the handle of a spring steel latch arm releases the latch arm from a keeper and rotates a spanning rod away from the cradle thereby releasing the cradle so that it rotates on its axis and dumps the bale of hay. The rotation of the cradle is stopped by the longitudinal side of the frame.

A pedestal is removably mounted above the wheels and supports a cradle with its latch/keeper assembly at a higher level than the remaining hay bale cradles. Raising the cradle above the wheels by use of the pedestal allows hay bales to be carried in this area and also allows for fenders to be placed over the wheels. The fenders along with lights and reflectors are required to make the trailer street worthy. The pedestal is removable so that the trailer can be adapted to carry other goods.

DESCRIPTION OF THE PREFERRED EMBODIMENT

The trailer 10 for hauling hay, of the present invention, is useful to farmers for safely unloading large cylindrical bales of hay from either lateral side of the trailer without winch or hydraulic power. The trailer 10 is modifiable so that the trailer 10 can be used for transporting goods other than hay such as, for example, irrigation pipe. With the presence of fenders and lights, the trailer 10 can be used on public streets.

Figure 1:
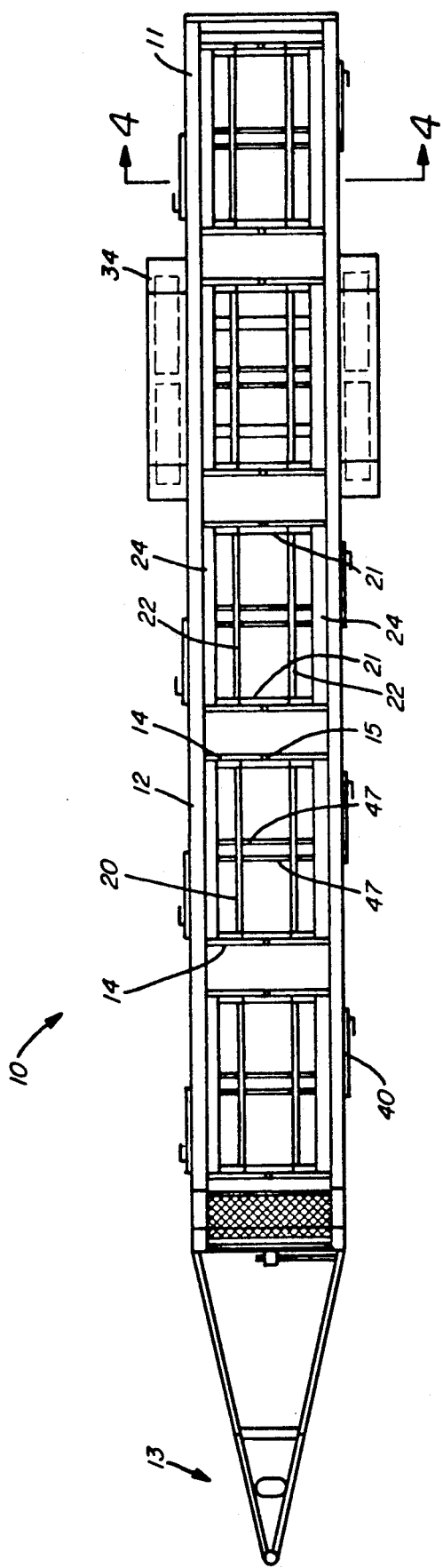
FIG. 1 is a top view of the present invention.
Figure 2:
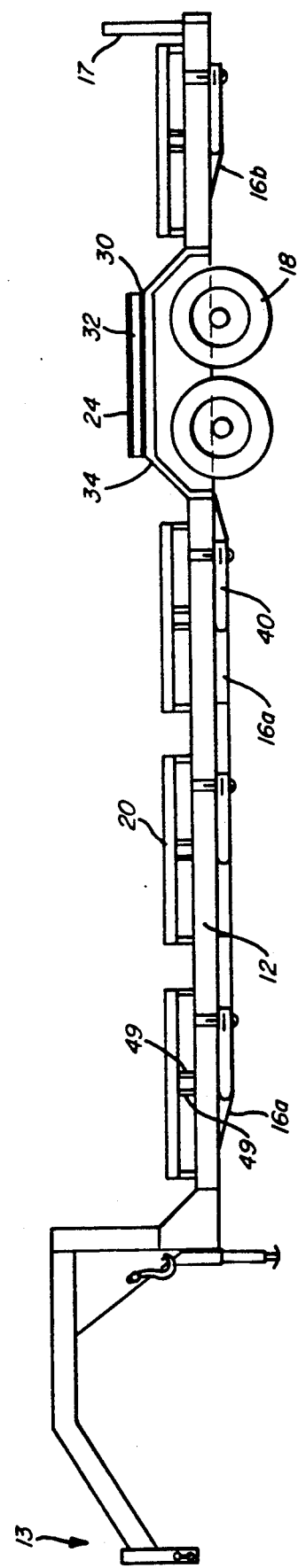
FIG. 2 is a side elevational view of the invention.

Referring now to the drawings, FIGS. 1 and 2 show respectively, the street worthy trailer, generally designated 10, for hauling hay (not shown). The trailer 10 includes generally a long rectangular frame 12 well known in the art, with transverse members 14 and cradles 20 for supporting the cylindrical bales of hay. Releasing one of the latch/keeper assemblies 40 on one side of trailer 10 causes the cradle 20 to tip and dump the cylindrical bales of hay to the opposite side. Sway braces 16a and 16b are attached to frame 12 and support latch/keeper assemblies 40. A pedestal 30, located over the wheels 18 positions a pedestal cradle 32 above the wheels 18 so that fenders 34, necessary for street worthiness, can be added.

In the preferred embodiment of the present invention the frame 12 is formed by two parallel longitudinal side members 11 with a plurality of transverse members 14. The frame 12 may be made of any rigid, long bearing material such as steel. A means 13 for coupling the trailer 10 to a truck as is well known in the art is positioned at the front of the frame 12.

On the transverse portion 14 of the frame 12 is a sleeve 15 for pivotally securing to abutting sleeves 25, 26 (FIG. 5) located on the cradle 20. A pin 27 held in place by cotter pins (not shown) or the like projects through the sleeves 15 and 25 or 26 to pivotally secure the cradle 20 to the frame 12. As shown, a preferable trailer includes four lower cradles 20 and one pedestal cradle 32.

Figure 5:
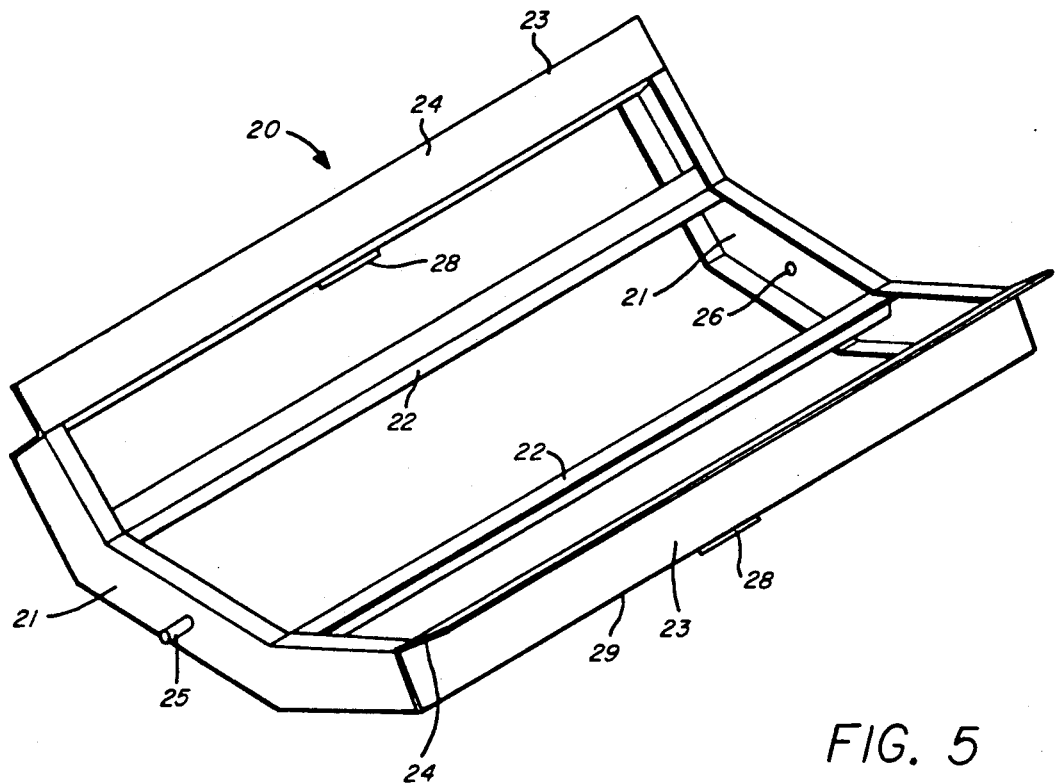
FIG. 5 is a detail perspective view of the concave cradle for supporting cylindrical hay bales.

Referring to FIG. 5 a view of cradle 20 is shown. The framework of the cradle 20 is constructed from two cradle-shaped end pieces 21 which are joined together by two lower cradle longitudinal angle members 22 and two upper cradle longitudinal angle members 23. The lower 22 and upper 23 angle members are preferably joined to the end pieces by a weld. The upper angle members 23 are joined in such a manner that a projecting lip 24 is formed along the longitudinal sides of the cradle 20. As shown the cradle 20 has a concave-shape similar to an arc of a radius corresponding to the circular bale of hay.

A cradle support latching rod 49 (FIG. 6) supports the cradle along the lower edge 29 of angle member 23 of the cradle 20 so that when both cradle supports 49 are in an upright position they secure the cradle 20 in a horizontal position for loading and carrying bales of hay. Rotation of the cradle supports 49 away from the lower edge 29 of angle member 23 of the cradle 20 allows the cradle 20 to tip and dump the hay bale.

Figure 6:
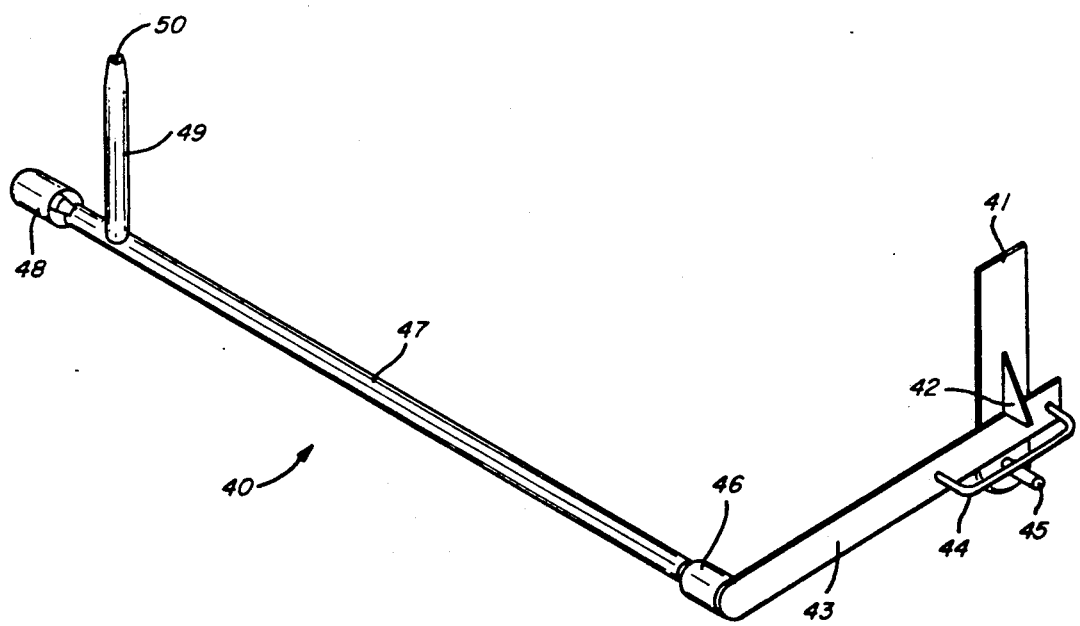
FIG. 6 is a detail perspective view of a latch/keeper assembly.

Latch/keeper assemblies 40 are mounted on opposite sides of the longitudinal side members 11 of the frame 12. These assemblies 40 are weight bearing latches which rotate the cradle supports 49. The latch/keeper assembly 40 as shown in FIG. 6 is constructed from a flat bar 41 welded to the longitudinal side member 11 of the frame 12, a wedgeshaped keeper 42 connected to the vertical flat bar 41 and a spring steel latch arm 43 with a handle 44 underneath the keeper 42 and held in place by the keeper 42. The handle 44 is used to pull the latch arm 43 out and away from the keeper 42 thereby allowing the latch arm 43 to rotate in an upwards (counterclockwise as shown) direction for dumping. The rotation of the latch arm 43 rotates a spanning rod 47 which is preferably made of pipe. The spanning rod 47 traverses the frame 12 underneath the cradle 20 so that a cradle support 49 extending upward and perpendicularly from the spanning rod 47 pivotally supports the cradle 20 at the lower edge 29 of angle member 23. The spanning rod 47 extends beyond the cradle support 49 and is rotatably supported at one end by a bushing 48 whose exterior is welded to the sway brace (16a or 16b) and frame 12 and at the other end by a bushing 46 whose exterior is welded to the frame 12 and sway brace (16a or 16b).

After dumping to resupport the cradle 20, the handle 44 is rotated in a clockwise direction as shown until latch arm 43 springs into the catch opening between keeper 42 and stop bar 45. Stop bar 45 projects further than keeper 42 from flat bar 41 to prevent over rotation of latch arm 43 when it is "kicked" into the catch opening and to prevent jostling during transport. As the latch arm 43 is rotated back into the catch opening, cradle support 49 will move back into contact with cradle 20 under angle member 23.

Referring to FIG. 5 a bearing plate 28 is optionally attached to the lower edge 29 of angle member 23 to provide an increased surface area for bearing against and protecting cradle support 49. The bearing plate 28 is preferably two inches by four inches and welded to angle member 23. Cradle support 49 is preferably grooved at the upper end and includes a ¾ inch diameter rod 50 welded within such groove. Rod 50 allows for ease of rotation of cradle support 49 by forming a smooth bearing surface for rotational function and by minimizing the area of contact between cradle support 49 and angle member 23 to reduce the forces of friction.

Latch/keeper assemblies 40 are designed to support cradle 20 during conditions of heavy vibration and could hold loads up to ten thousand pounds (the average hay bale weighs around one thousand two hundred pounds). When the cradle 20 dumps, lip 24 of angle member 23 will lower between three to five degrees below the horizontal which is more than sufficient to dump a bale of hay which gathers inertia during the actual "dumping."

Two or more wheels 18 support the trailer 10. A pedestal 30 is removably mounted to the frame 12. Pedestal 30 is positioned over the wheels 18 so that this area may be utilized to carry hay while allowing for wheel coverings or fenders 34.

The pedestal 30 and the pedestal cradle 32 can be removed thereby allowing the trailer 10 to be utilized for carrying goods other than hay such as irrigation pipe.

One embodiment of the invention uses a plurality of bolts (not shown) passing through the frame 12 and the pedestal 30 to removably fasten the pedestal 30 to the frame 12. The structural members of the pedestal 30 are welded in a configuration that elevates the pedestal 30 to a position above the wheels 18. The pedestal cradle 32 is similar to cradles 20 except that pedestal 30 holds pedestal cradle 32 at a higher level than the other cradles 20 of the trailer 10. The pedestal cradle 32 has its own dual latch/keeper assemblies (not shown). The pedestal cradle 32 and the pedestal latch/keeper assemblies (not shown) perform in the same manner as described for the cradles 20 and latch/keeper assemblies 40 supported by the frame 12.

The wheels 18 are covered by fenders 34 which are fixed to the frame 12 and juxtaposed above the wheels 18. The fenders 34, along with a means for lighting 19 are common in the art and allow the trailer 10 to be street worthy.

Figure 3:
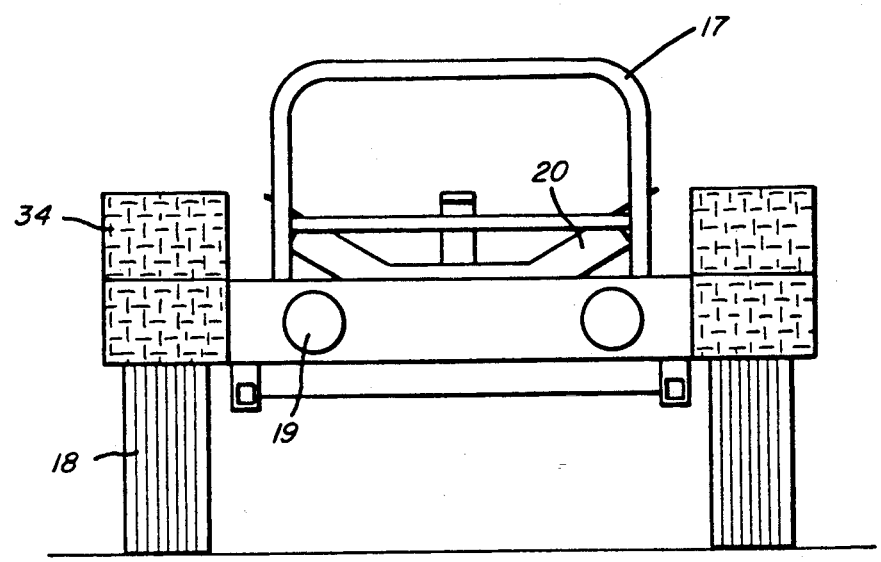
FIG. 3 is a rear elevational view of the invention.
Figure 4:
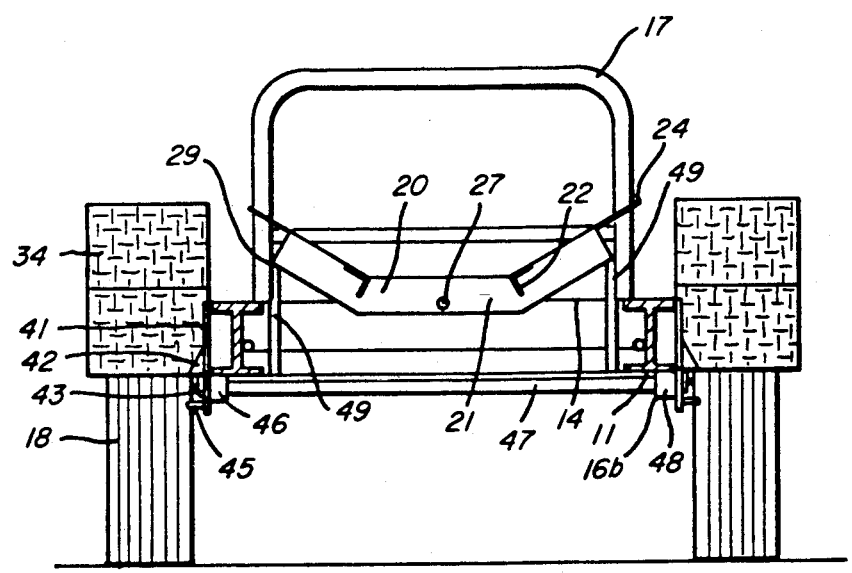
FIG. 4 represents a cross-sectional view of FIG. 1 taken along line 4—4 of FIG. 1.

As shown in FIG. 3, hay bale retainer 17 is used to prevent hay bales from bouncing off of the trailer 10 during loading or prior to transport. During transport the bales are normally strapped down. One embodiment of the hay bale retainer is an upright arc-shaped tubing arrangement.

The foregoing disclosure and description of the invention are illustrative and explanatory. Various changes in the size, shape, combination and materials as well as in the details of the illustrated construction may be made without departing from the spirit or the scope of the invention. It is understood that the invention is not limited to the embodiments set forth herein for purposes of exemplification, but it is to be limited only by the scope of the attached claims or claim including the full range of which each element thereof is entitled.

We claim:

1. A trailer for hauling goods which comprises:
   a frame;
   a cradle mounted on said frame; and
   at least one pair of latch/keeper assemblies, one assembly of each pair mounted on opposite sides of said frame whereby release of one of said latch/keeper assemblies on one side of said frame causes said cradle to tilt toward an opposite side of said frame, said latch/keeper assemblies including a flat bar fixed to said frame, a wedge-shaped keeper attached perpendicularly to said flat bar, a stop bar attached to said flat bar below said wedge-shaped keeper to define a catch opening between the keeper and the flat bar, a springed latch arm movable to be inserted in the catch opening, and a handle on said springed latch arm for pulling the springed latch arm away from said keeper.

2. The trailer for hauling goods as recited in claim 1, further including means for pivotally securing said cradle to said frame at two points so that said cradle axially rotates in relation to said frame.

3. The trailer for hauling goods as recited in claim 1, wherein said cradle comprises two longitudinal sides, a lip bordering said longitudinal sides, and a sleeve in a transverse portion of said cradle.

4. The trailer for hauling goods as recited in claim 1 wherein said latch/keeper assemblies further include a spanning rod fitted to said springed latch arm at one end and supported by a bushing on each end, said bushings being attached to said frame.

5. The trailer for hauling goods as recited in claim 4 wherein said latch/keeper assembly further includes a cradle support fixed at one end to said spanning rod under one side of said cradle such that when said springed latch arm is in the catch opening said cradle support is in an upright position to support said cradle.

6. The trailer for hauling goods as recited in claim 1 further including a plurality of wheels rotatably connected to said frame, a pedestal removably mounted to said frame in position over at least two of said wheels and a second cradle mounted on said pedestal at a level above the level of said cradle mounted on said frame.

7. The trailer for hauling goods as recited in claim 6 further including means for dumping said second cradle on opposite sides of said pedestal, said dumping means being pivotally attached to said pedestal for pivotally supporting said second cradle.

8. A trailer for hauling goods which comprises:
a frame;
a plurality of wheels rotatably connected to said frame;
a first cradle pivotally connected to said frame;
a means for tilting said first cradle toward opposite sides of said frame, said means for tilting being pivotally attached to said frame for pivotally supporting said first cradle;
said means for tilting comprising at least one pair of latch/keeper assemblies, one assembly of each pair mounted on opposite sides of said frame whereby release of one of said latch/keeper assemblies on one side of said frame causes said first cradle to tilt toward an opposite side of said frame;
a pedestal removably mounted to said frame in position over at least two of said wheels; and
a second cradle pivotally connected to said pedestal at a level above the level of said first cradle.

9. The trailer for hauling goods as recited in claim 8 wherein said latch/keeper assemblies comprise a flat bar fixed to said frame, a wedge-shaped keeper attached perpendicularly to said flat bar, a stop bar attached to said flat bar below said wedge-shaped keeper to define a catch opening between the keeper and the flat bar, a springed latch arm movable to be inserted in the catch opening, and a handle on said springed latch arm for pulling the springed latch arm away from said keeper.

10. The trailer for hauling goods as recited in claim 9 wherein said latch/keeper assemblies further include a spanning rod fitted to said springed latch arm at one end and supported by a bushing on each end, said bushings being attached to said frame.

11. The trailer for hauling goods as recited in claim 10 wherein said latch/keeper assembly further includes a cradle support fixed at one end to said spanning rod under one side of said cradle such that when said springed latch arm is in the catch opening said cradle support is in an upright position to support said cradle.

12. A trailer vehicle for hauling goods as recited in claim 8 further including at least two fenders fixed to said frame and juxtaposed above at least two of said wheels.

13. A trailer for hauling goods comprising:
a frame having at least two sleeves attached to at least two transverse members of said frame;
at least one cradle comprising two longitudinal sides, a lip bordering said longitudinal sides, and two second sleeves one each attached to two transverse portions of said cradle, said second sleeves corresponding to said first sleeves in said frame;
a removable pin projecting through said first and said second sleeve to rotationally secure said cradle to said frame;
at least one pair of latch/keeper assemblies, one assembly of each pair mounted on opposite sides of said frame whereby release of one of said latch/keeper assemblies on one side of frame causes said cradle to tilt toward an opposite side of said frame;
said latch/keeper assemblies comprising a flat bar fixed to said frame, a wedge-shaped keeper attached perpendicularly to said flat bar, a stop bar attached to said flat bar below said wedge-shaped keeper to define a catch opening between the keeper and the flat bar, a springed latch arm moveable to be inserted in the latch opening, and a handle on said springed latch arm for pulling the springed latch arm away from said keeper;
a spanning rod fitted to said springed latch arm at one end and supported by a bushing on the other end, said bushing being attached to said frame;
a cradle support fixed at one end to said spanning rod under one side of said cradle such that when said springed latch arm is in the catch opening said cradle support is in an upright position to support said cradle;
a plurality of wheels rotatably connected to said frame; and
a pedestal removably mounted to said frame in position over at least two of said wheels and a second cradle mounted on said pedestal at a level above the level of said cradle mounted on said frame.

* * * * *